May 12, 1931.  J. D. JONES  1,804,693
WATER COOLED BEARING
Original Filed June 19, 1926  2 Sheets-Sheet 1

Inventor
John D. Jones
By
Morrill
Attorney

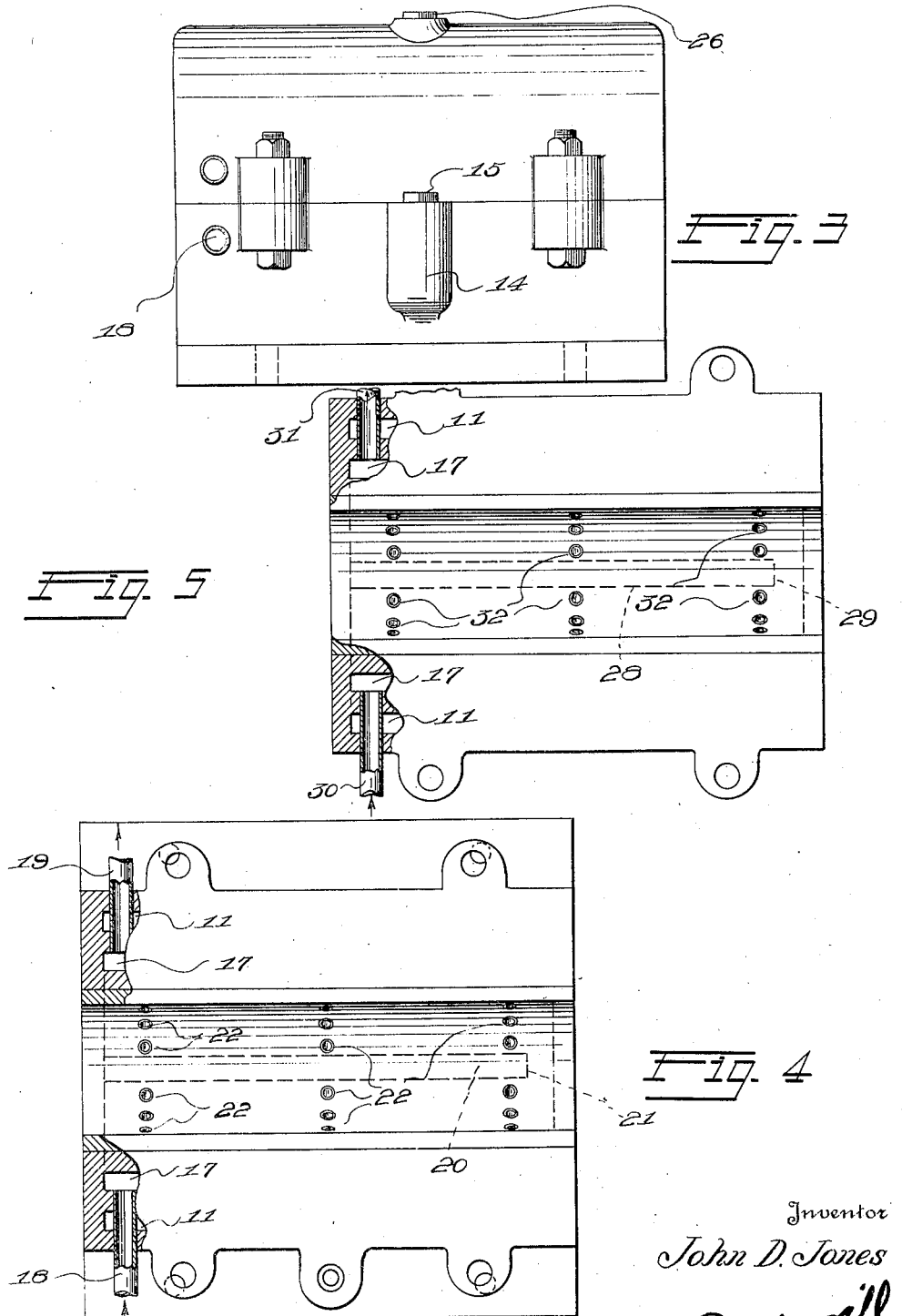

Patented May 12, 1931

1,804,693

UNITED STATES PATENT OFFICE

JOHN D. JONES, OF PORTLAND, OREGON

WATER COOLED BEARING

Application filed June 19, 1926, Serial No. 117,080. Renewed September 24, 1930.

This invention relates to water cooled bearings and has for an object to provide a bearing having a chamber for water or other cooling medium interposed between the bearing proper and an externally located oil or lubricant chamber.

A further object of the invention is to provide a bearing having an oil or lubricant chamber surrounding the bearing with a chamber interposed between the bearing and the lubricant chamber for containing water or other cooling fluid and through which said cooling chamber oil from the oil chamber passes to the bearing.

A further object of the invention is to provide a bearing having a lubricant chamber surrounding the bearing with a chamber intermediate the lubricant chamber and the bearing with tubes extending from the lubricant chamber through the cooling chamber to the bearing and through which tubes the oil from the lubricant chamber passes to the bearing, being cooled by contact with the walls of the cooling chamber and the cooling medium surrounding tubes leading from the lubricant chamber to the bearing.

With these and other objects in view, the invention comprises certain novel parts, elements, units, combinations, constructions, interactions and functions as disclosed in the drawings together with mechanical and functional equivalents thereof as will be hereinafter more fully described and claimed.

In the drawings:

Figure 3 is a view of the bearing in side elevation.

Figure 4 is a plan view of the bottom section of the bearing with the top section removed, parts being broken away to show the water passages.

Figure 5 is an inverted plan view of the top section of the bearings, parts also being broken away therein.

In all bearings in addition to supplying a lubricant to form a film between the bearing and the journal it is also desirable to maintain the bearing as cool as possible and in many cases the mere application or supplying of the lubricant film fails to accomplish the purpose.

Figure 1:
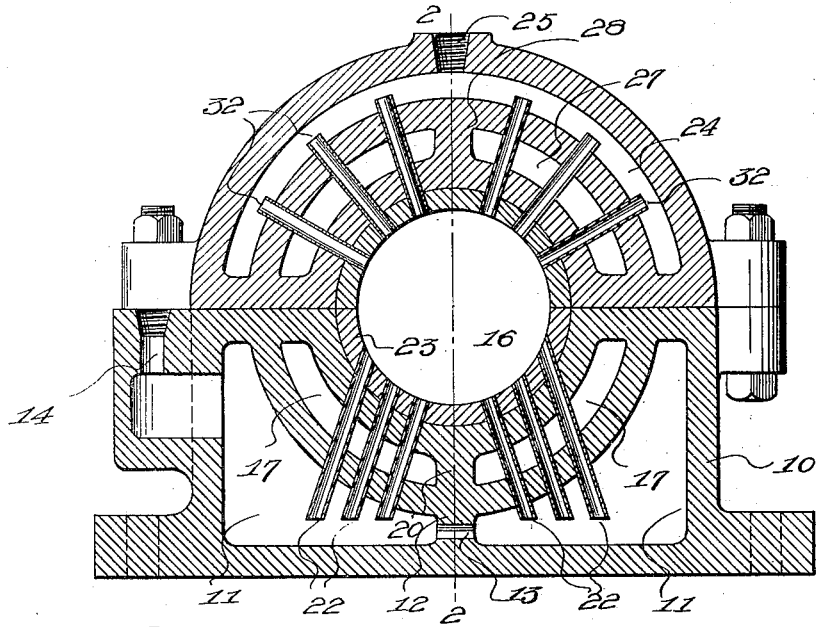
Figure 1 is a vertical transverse sectional view through one type of bearing.
Figure 2:
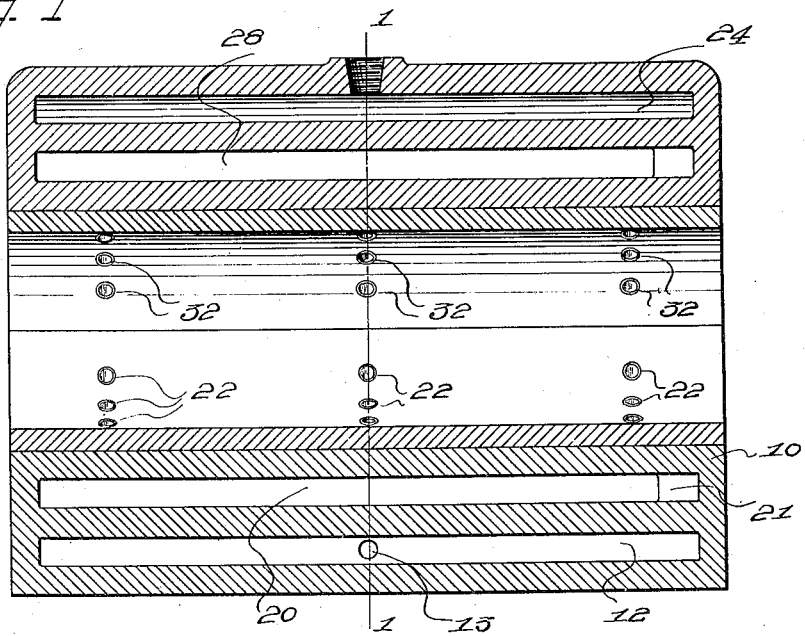
Figure 2 is a longitudinal diametrical sectional view through the bearing taken on line 2—2 of Figure 1 and disclosing line 1—1 as the plane of Figure 1.

The present invention involves means for additionally cooling the bearing. As shown at Figure 1, the base of the bearing 10 is provided with a lubricant chamber 11. As shown at Figures 1 and 2, a rib 12 is formed intermediate the sides of the bearing, but merely for supporting the structure, and a passage 13 is provided communicating between the sides of the chamber so that the oil level in both sides may be maintained uniformly when the oil has been introduced through the filler conduit 14, which said conduit is preferably provided with a screw plug 15 or any other approved mechanical closure.

Adjacent the oil chamber 11 and between such chamber and the bearing opening 16 is provided a chamber 17 for water or other cooling medium, which water or cooling medium is supplied to the chamber through the inlet pipe 18 discharging through the outlet pipe 19. So that the water thus introduced for circulation into and through the chamber 17 shall traverse the entire chamber, a rib 20 is provided extended longitudinally through the chamber 17 but stopping short of one end of the bearing as indicated at 21 in Figure 4, so that the water entering through the pipe 18 must circulate about the end 21 of the rib 20 to discharge through the outlet 19.

For conducting oil from the chamber 11 to the bearing, a plurality of tubes 22 are introduced to pass through the walls of the chambers 11 and 17 and through the bushing 23 to the bearing opening 16, as shown more particularly at Figure 1. These tubes are spaced upon opposite sides of the plane of maximum contact of the shaft with the bearing. The tubes upon one side constitute inflow conduits to the bearing opening and the tubes upon the other side constitute outflow conduits from the opening, depending upon the direction of rotation of the shaft within the journal bearing.

The top section of the bearing is constructed in like manner having an oil chamber 24 filled through the filling opening 25 also closed to airtight position by the screw plug 26 or other efficient mechanical means. A water chamber 27 is interposed between the oil chamber 24 and the bearing in the same manner as the oil chamber 17 and is similarly provided with a rib 28 stopping short of the end of the bearing as at 29 (see Figure 5). Water or other cooling medium is introduced into the chamber 24 through the inlet pipe 30 and flowing about the end of the rib 28 is discharged through the pipe 31. Tubes 32 are likewise provided to conduct the oil from the chamber 24 through the cooling chamber 27 to the bearing. The two halves of the bearing are, of course, assembled as at Figure 1 and the omission of a gasket or other intervening means between the halves is no limitation upon the well known practice in such cases.

The oil chambers being supplied with oil, the water chambers are connected with a source of running water so that the water flows continuously while in operation through the chambers intermediate the oil chamber and the bearing. The introduction of this cooling medium adjacent to the bearing proper results in cooling the bearing by direct contact of the water with the walls of the bearing openings. The presence of the cooling medium adjacent the oil chamber also cools the oil which is further cooled by passing through the tubes or passages from the oil chamber extending through the water chamber to the bearing. The oil is circulated from the oil chamber to the bearing and back again into the oil chamber and will, of course, tend to enter the oil chamber in a more or less heated condition from its employment as a lubricating film in the bearing. When passing back through some of the tubes into the oil chamber, it is subjected first to the cooling effect of the cooling medium and after entering the oil chamber is further subjected to the cooling effect of the adjacent body of water and, when again passing from the oil chamber to the bearing, is subjected to the cooling influence of the water surrounding or adjacent to the passages from the oil chamber to the bearing.

What I claim to be new is:

1. A bearing having a journal opening, a cooling chamber spaced about the journal opening, a lubricant supply chamber spaced about the cooling chamber, inflow and outflow conduits spaced upon opposite sides of the plane of maximum contact, said inflow and outflow conduits forming communication from the journal opening to the lubricant supply chamber and passing through the cooling chamber.

2. A bearing having a journal opening, a cooling chamber spaced concentrically about the journal opening with a wall common to both, a lubricant supply chamber spaced concentrically about the cooling chamber with a wall common to both, and inflow and outflow conduits forming communication from the lubricant chamber to the journal opening upon opposite sides of the plane of maximum contact and passing through the cooling chamber.

3. A bearing having a journal opening, a cooling chamber spaced about the journal opening with a wall common to both, a lubricant supply chamber spaced about the cooling chamber with a wall common to both, inflow and outflow conduits forming communication from the lubricant chamber to the journal opening, spaced longitudinally of the journal opening and upon opposite sides respectively of the plane of maximum contact, and means providing a conduit for cooling fluid within the cooling chamber.

In testimony whereof I affix my signature.

JOHN D. JONES.